United States Patent [19]

Hauser

[11] 4,255,493
[45] Mar. 10, 1981

[54] POWDERED METAL PART

[75] Inventor: Hans Hauser, Bradenton, Fla.

[73] Assignee: The J. B. Foote Foundry Co., Fredericktown, Ohio

[21] Appl. No.: 11,367

[22] Filed: Feb. 12, 1979

[51] Int. Cl.³ .......................... B22F 7/00; F16C 35/00
[52] U.S. Cl. .................................... 428/546; 428/577; 428/582; 428/583; 428/596; 308/22; 308/25; 308/27
[58] Field of Search .................. 75/214; 428/546, 573, 428/582, 583, 577, 592, 596; 308/22, 25, 27

[56] References Cited

U.S. PATENT DOCUMENTS

| | | | |
|---|---|---|---|
| 2,341,860 | 2/1944 | Ellis | 428/546 |
| 2,479,364 | 8/1949 | Jocelyn | 75/214 X |
| 2,695,230 | 11/1954 | Haller | 75/214 X |
| 3,790,374 | 2/1974 | Dedek | 75/214 X |
| 3,923,177 | 1/1976 | Coleman | 75/214 |
| 4,077,508 | 3/1978 | Pedersen | 308/27 X |

Primary Examiner—Richard E. Schafer
Attorney, Agent, or Firm—Allen D. Gutchess, Jr.

[57] ABSTRACT

A powdered metal part is provided with a side recess or notch which is shaped to receive a threaded member or screw. The part is made from powdered metal formed under high pressure by punches and a die and the part is then sintered. The threaded member is threaded into the notch in a direction which is transverse to the direction in which the punches and die are brought together to form the part. The recess or notch has generally parallel side walls extending between opposite surfaces of the part with the side walls having V-shaped ridges and grooves. The ridges are opposite the grooves to threadedly receive a machine screw or the like which is turned into the open end of the notch.

5 Claims, 7 Drawing Figures

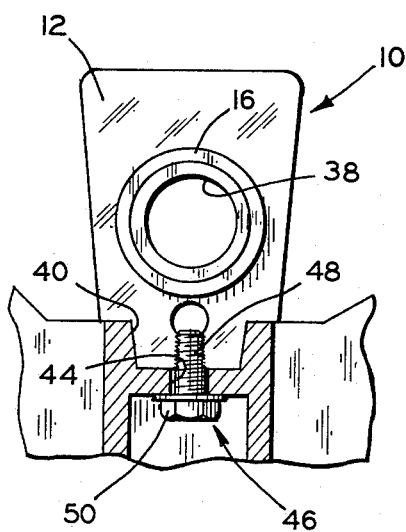
FIG. 5
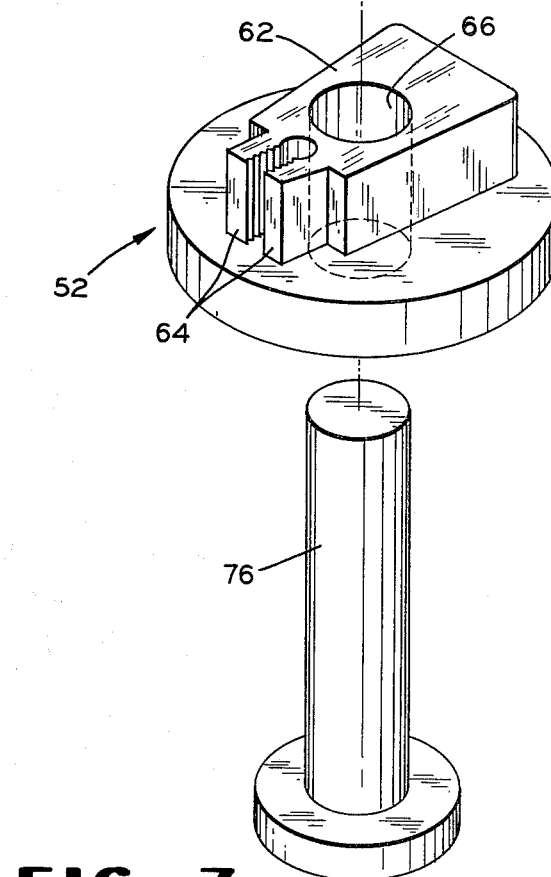
FIG. 7
FIG. 6

POWDERED METAL PART

This invention relates to a powdered metal part having a side recess or notch formed to receive a threaded member.

Powdered metal parts are made by pressing powdered metal under high pressure between punches and a die and then sintering the part. If the part to be formed has a tapped hole located in the direction in which the punches and die come together, the hole can sometimes, at least, be formed as the product is formed, with the hole subsequently being tapped, in a separate operation, to receive a threaded member. Otherwise, the hole has to be subsequently both drilled and tapped, two separate operations, after the part is formed.

The present invention provides a powdered metal part with a recess or notch which can receive a threaded member, such as a machine screw, in a direction transverse to the direction in which the punches and die are brought together. The recess or notch is formed in a side edge of the part by the punches and die. The notch has at least one side which is open at at least one main surface formed by the metal punches and has an open end at a side edge of the part. The notch has side walls which are generally parallel and are serrated or formed with generally V-shaped ridges and grooves in the direction the punches and die are brought together. The grooves are opposite the ridges so that a threaded member can be turned into the notch from the open end and be threadedly engaged therein, somewhat similarly to a drilled and tapped hole. However, after the part is formed, no additional machining operations are required whatsoever.

It is, therefore, a principal object of the invention to provide a powdered metal part or the like having a formed notch or recess therein to receive a threaded member, without requiring additional operations after the part is formed.

Other objects and advantages of the invention will be apparent from the following detailed description of a preferred embodiment thereof, reference being made to the accompanying drawings, in which:

FIG. 5 is an exploded view in perspective of the part and threaded member about to be assembled with a housing;

FIG. 6 is a view in vertical cross section showing the part, threaded member, and housing in assembled relationship; and FIG. 7 is a schematic view in perspective of punches, a die, and a core for producing the powdered metal part.

Figure 1:
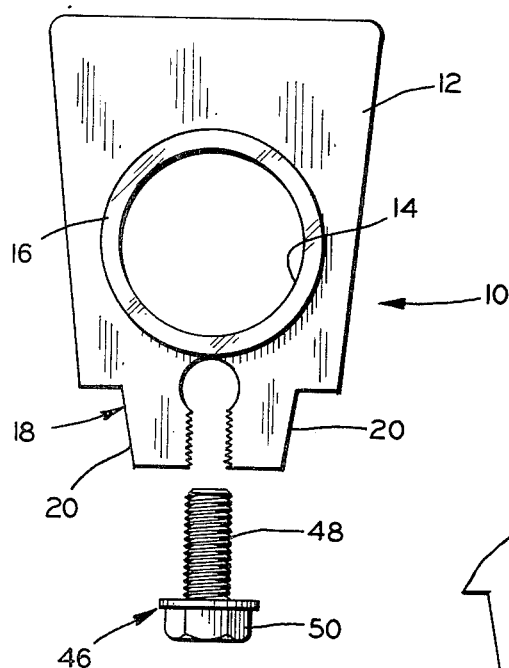
FIG. 1 is a front view in elevation of a powdered metal part made in accordance with the invention, and a threaded member.
Figure 2:
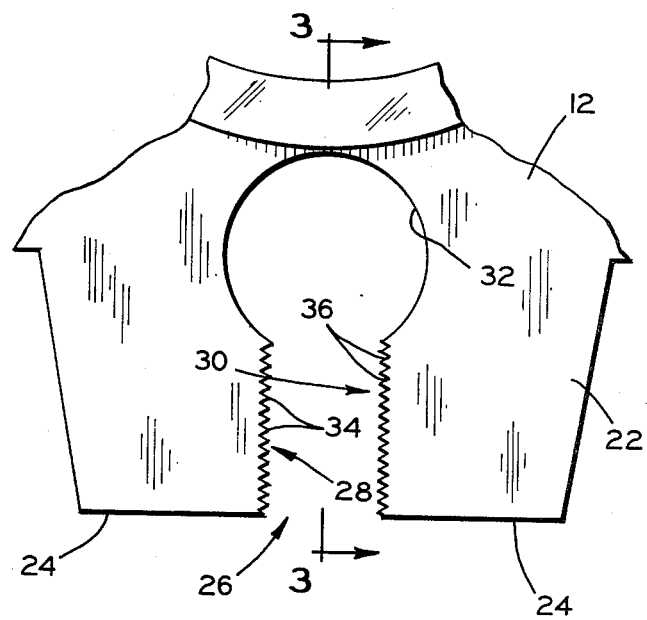
FIG. 2 is an enlarged, fragmentary view in elevation of a portion of the part of FIG. 1.
Figure 3:
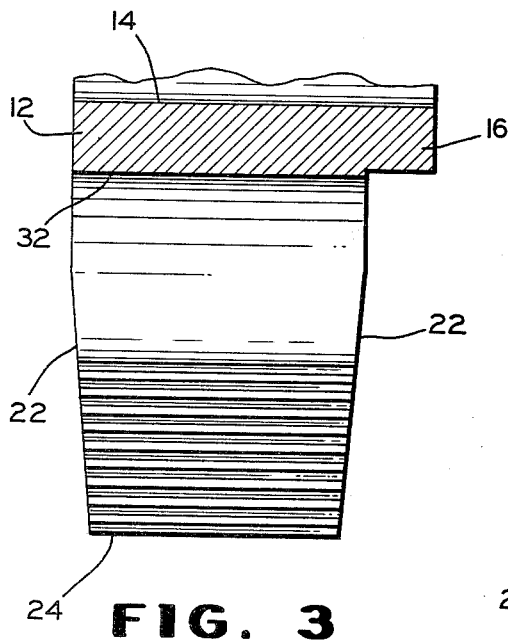
FIG. 3 is a fragmentary view in cross section, taken along the line 3—3 of FIG. 2.
Figure 4:
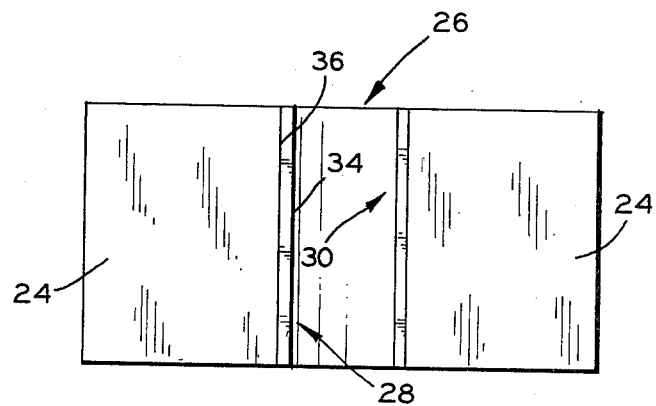
FIG. 4 is a fragmentary bottom view of the portion of the part shown in FIG. 2.

Referring to the drawings, and particularly to FIG. 1, a powdered metal part embodying the invention is indicated at 10. In this instance, the part has two generally parallel, major planar surfaces 12 with a central opening 14 extending therethrough, terminating on the one side in a circular ridge 16. The opening 14 is designed to hold a bearing, as will be discussed subsequently. A tapered neck or projection 18 extends downwardly from the part and has tapered side edges 20. As shown in FIG. 3, the major surfaces 12 also taper somewhat at 22. The neck 18 terminates in a lower side wall or edge 24.

In accordance with the invention, a recess or notch 26 is formed in the part and, as shown, is open on both sides, extending completely between the main surfaces 12 or, specifically, the tapered portions 22 thereof. Actually, the recess or notch need only be open on one side and may not extend completely through the part 10. The notch 26 also has generally parallel side walls 28 and 30 which terminate at a generally semi-cylindrical end opening 32. The side walls 28 and 30 have serrations therein, specifically V-shaped ridges 34 and V-shaped grooves 36 therebetween. The ridges 34 of the side wall 28 are opposite the grooves 36 of the side wall 30 to enable the recess 26 to receive a threaded member. As seen in FIG. 3, the grooves and recesses are formed parallel to the central opening 14 and the side edges of the powdered metal part 10 so that they can be formed when the part is formed, as will be discussed more fully subsequently.

As shown in FIGS. 5 and 6, the part 10 is intended to serve as an intermediate support for a shaft in a transmission. As such, the part 10 has a bearing 38 therein to rotatably support an intermediate portion of the shaft. The tapered neck or projection 18 is received in a recess 40 of a transmission housing 42, the bottom of the recess 40 having a bore 44 which is aligned with the open end of the notch 26. A threaded member or screw 46 has a threaded shank 48 extending through the bore 44 and into the notch 26 with a head 50 of the screw bearing against the outer surface of the housing 42.

As shown in FIG. 1, the diameter of the threaded shank 48 equals the distance between the side walls 28 and 30 of the notch 26. Consequently, when the screw 46 is turned into the notch 26, it extends into the grooves 36. This provides a tight and secure connection for the parts although not as strong a connection as with a tapped hole having 360° engagement with the screw.

The powdered metal part 10 is made by pressing powdered metal under high pressure between punches and a die and then sintering the part. FIG. 7 shows punches 52 and 54 and a die 56 which are illustrative of apparatus which can be used to form the powdered metal part, although they are not necessarily the actual ones which would be used. As shown, the die 56 includes a main opening 58 forming the main shape of the part with a splined core rod 60 extending into the opening to form the notch 26, including the end opening 32. The lower punch 52 has a main projection 62 which is similar in size and shape as the opening 58 and has two edge bars 64 which fit on each side of the splined core rod 60. The lower punch 52 also has a central passage 66. Similarly, the upper punch 56 has a main projection 68 with end bars 70 and a central passage 72. The upper punch 56 also has a circular groove 74 around the passage 72 to form the ridge 16 on the powdered metal part 10. A core rod 76 extends upwardly through the lower punch passage 66, through the main opening 58, and into the upper punch passage 72, the core rod forming the opening 14 in the part 10.

Various modifications of the above-described embodiment of the invention will be apparent to those skilled in the art, and it is to be understood that such modifications can be made without departing from the scope of the invention, if they are within the spirit and the tenor of the accompanying claims.

I claim:

1. A powdered metal part formed by punches and a die which are brought together to form the part from powdered metal under high pressure, said part having a recess therein with at least one side open at a first surface of the part and an end open at another surface of the part which is transversely disposed with respect to the first surface, said recess having generally parallel side walls, said side walls having serrations including generally V-shaped ridges and generally V-shaped grooves which are straight and are parallel to the direction in which the punches and die are brought together, the V-shaped ridges on one side wall being aligned with the V-shaped grooves on the other side wall, said ridges and grooves being effective to receive a threaded member turned into the recess between the side walls from the open end of the recess.

2. A powdered metal part according to claim 1 characterized by said recess terminating at the end opposite the open end in a generally semi-cylindrical opening beyond said ridges and grooves.

3. A powdered metal part according to claim 1 characterized further by said recess having a second side open at a surface of the powdered metal part spaced from said first surface.

4. A powdered metal part having two opposite, formed surfaces, said part having an elongate notch extending between the surfaces and having an open end at another surface, said notch having generally parallel side walls, said side walls having serrations including straight V-shaped ridges and straight V-shaped grooves with the V-shaped ridges on one side wall being aligned with the V-shaped grooves on the other side wall, all of said ridges and grooves being parallel and effective to threadedly receive a screw turned into the notch between the side walls from the open end of the notch.

5. A powdered metal part accordingly to claim 4 characterized by said notch terminating in a generally semi-cylindrical opening extending between the two opposite surfaces, with the axis of said semicylindrical opening being parallel to said ridges and grooves.

* * * * *